United States Patent [19]
Miyagoshi

[11] 3,991,350
[45] Nov. 9, 1976

[54] SHAFT ANGLE ADJUSTMENT OF A SYNCHRONIZED TANDEM-PRESS PRODUCTION LINE

[75] Inventor: Hisashi Miyagoshi, Komatsu, Japan

[73] Assignee: Kabushiki Kaisha Komatsu Seisakusho, Tokyo, Japan

[22] Filed: Sept. 20, 1974

[21] Appl. No.: 507,929

Related U.S. Application Data

[63] Continuation-in-part of Ser. No. 396,301, Sept. 11, 1973, which is a continuation of Ser. No. 177,757, Sept. 3, 1971.

[30] Foreign Application Priority Data

Sept. 7, 1970    Japan.............................. 45-77779

[52] U.S. Cl..................................... 318/85; 318/74
[51] Int. Cl.².................................................. H02P 5/46
[58] Field of Search ..................... 318/85, 74, 46, 47

[56] References Cited
UNITED STATES PATENTS

| | | | |
|---|---|---|---|
| 2,929,974 | 3/1960 | Wells................................... | 318/46 |
| 3,024,395 | 3/1962 | Pedersen et al. ................. | 318/85 X |
| 3,030,564 | 4/1962 | Early et al. ...................... | 318/85 X |
| 3,199,439 | 8/1965 | Danly................................ | 318/85 X |
| 3,549,948 | 12/1970 | Jaeschke.......................... | 318/85 X |
| 3,557,686 | 1/1971 | Sapolsky.......................... | 318/85 X |
| 3,621,348 | 11/1971 | Uchida et al. ................... | 318/85 X |
| 3,659,166 | 4/1972 | Fredell................................. | 318/85 |
| 3,675,098 | 7/1972 | Heiberger........................... | 318/85 |
| 3,728,597 | 4/1973 | Cummens et al..................... | 318/85 |
| 3,746,957 | 7/1973 | Foster et al....................... | 318/85 X |

Primary Examiner—Robert K. Schaefer
Assistant Examiner—John J. Feldhaus
Attorney, Agent, or Firm—Toren, McGeady and Stanger

[57]    ABSTRACT

An improved technique is disclosed for adjusting the crankshaft angle of each of a plurality of synchronized tandem-coupled presses with respect to a reference shaft angle. At the start of adjustment, a plurality of first motors that synchronously drive the successive crankshafts during normal press operation are disengaged from the crankshafts and maintained operative with undiminished speed. A plurality of second motors operative at a speed slightly greater than the speed of the reference shaft are thereafter enabled when the angular phase of each crankshaft relative to that of the reference shaft is within a prescribed angular range. Such range is established by means of a synchro-driven control system coupled to the reference shaft and to the crankshaft when the first motor is disengaged from the crankshaft. Once the required angular adjustment is completed, the rotating first motor may be reengaged to the crankshaft to restore normal press operation.

6 Claims, 6 Drawing Figures

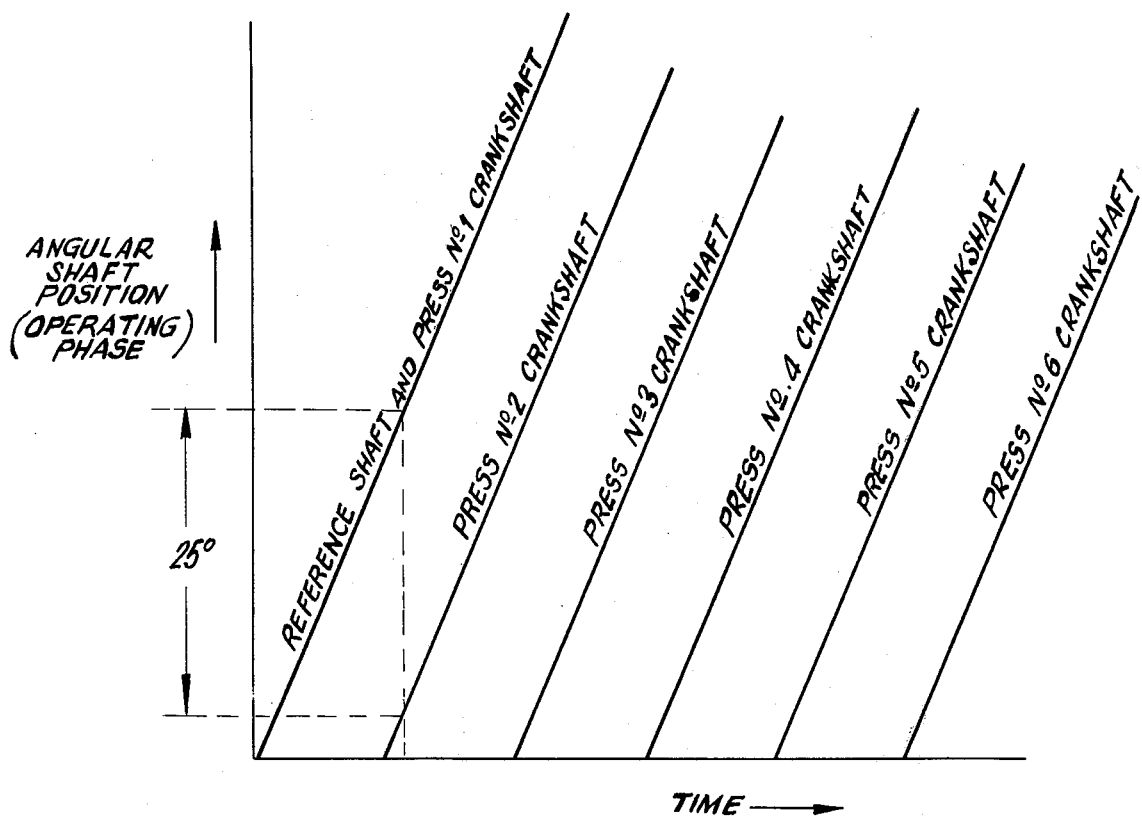
FIG. 2
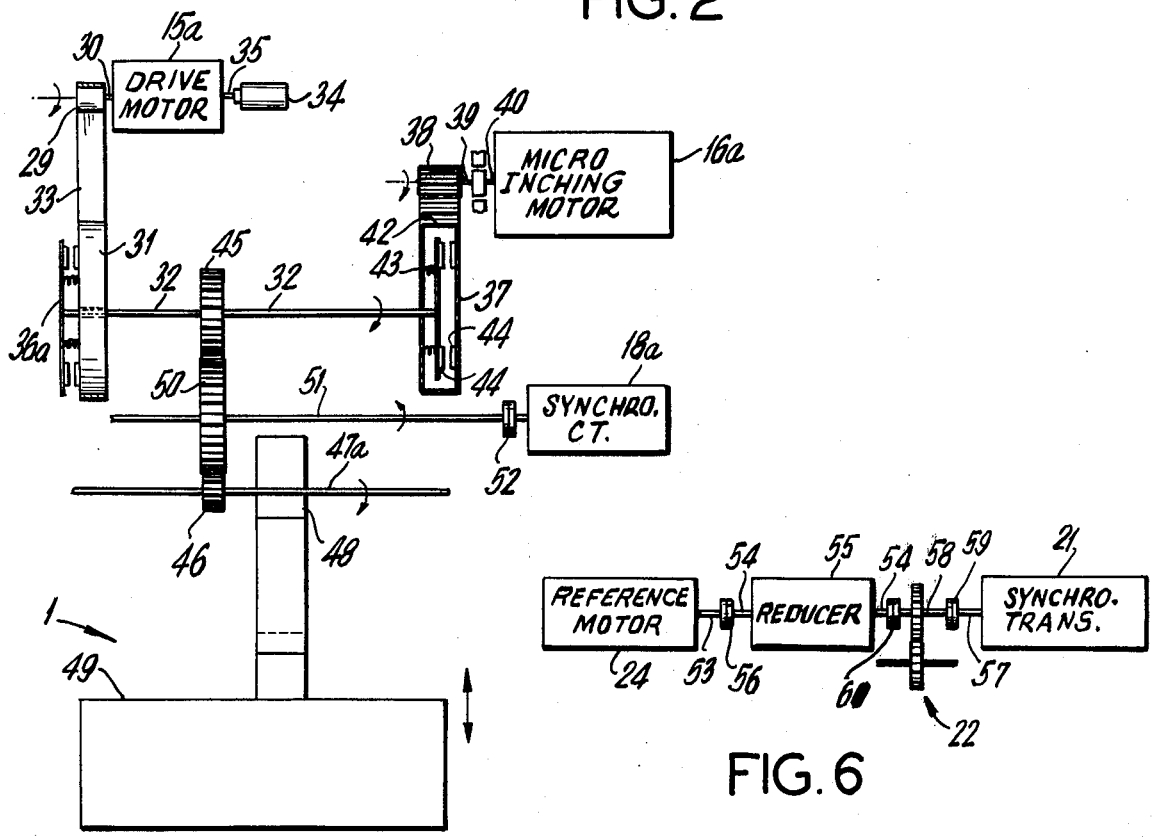
FIG. 5
FIG. 6

SHAFT ANGLE ADJUSTMENT OF A SYNCHRONIZED TANDEM-PRESS PRODUCTION LINE

CROSS-REFERENCE TO RELATED APPLICATIONS

This application is a continuation-in-part of copending application Ser. No. 396,301, filed Sept. 11, 1973, and entitled "Method of Synchronized Micro-Driving of Synchronous Press Line", which is in turn a Continuation of application Ser. No. 177,757 filed Sept. 3, 1971, also entitled "Method of Synchronized Micro-Driving of Synchronous Press Line".

BACKGROUND OF THE INVENTION

In a synchronized tandem-press production line, the successive presses are normally driven by associated first motors at identical speeds and with a prescribed progressive shift in the angular positions of their respective crankshafts relative to that of a reference shaft. Any required adjustments of the angular position of each of the crankshafts relative to the reference shaft (such as adjustment required after an emergency stop of the presses) are conventionally accomplished while "micro-inching" each first motor at low speed during a slide stroke of the associated press, e.g., by reducing the speed of the first motor to about 1 RPM.

With such arrangements, each angle adjustment requires a relatively long press down-time, including the time needed to slow down the first motor to microinching speed prior to adjustment and the time needed to speed the first motor back up to operating speed after the adjustment. Such down-time can approach 1½ minutes, thereby making adjustment slow and inefficient.

SUMMARY OF THE INVENTION

An improved arrangement for rapidly and efficiently adjusting the angular position of a press crankshaft in a tandem-press production line of this type is provided by the present invention. Illustratively, the first motor associated with each crankshaft is disengaged from such crankshaft at the start of the adjustment while running at full speed. Such disengagement is accomplished by coupling, to the reference shaft, a synchro transmitter whose electrical output is applied to the input of a synchro control transformer. The shaft of the transformer is coupled to the crankshaft of the associated press so that the output voltage of the transformer lies within a predetermined excitation range during the time that the instantaneous angular difference between the crankshaft and the reference shaft lies within a synchronizing range $\pm \theta$.

A control circuit responsive to the output of the control transformer enables a normally inoperative, microinching second motor to drive the crankshaft whenever the output voltage of the transformer lies within the excitation range. The second motor operates at an angular speed slightly greater than that of the reference shaft to provide micro-inching of the crankshaft from an initial angular position to an adjusted angular position relative to the reference shaft. When the desired adjusted position is obtained, the synchro system is cut out and the first motor, which had continued to rotate at full speed during the adjustment, is reengaged with the crankshaft to restore normal synchronized press operation. Interlock facilities may be provided for automatically effecting such engagement of the first motor to the crankshaft.

BRIEF DESCRIPTION OF THE DRAWING

The invention is more fully set forth in the following detailed description taken in conjunction with the appended drawing, in which:

FIG. 2 is a graph illustrating a progressive shift in angular position of the crankshafts of the successive presses of FIG. 1 during normal press operation;

FIG. 5 is a pictorial diagram of an arrangement for mechanically coupling the various drive and control elements of FIG. 1 to a press crankshaft; and FIG. 6 is a pictorial diagram of an arrangement for mechanically coupling a synchro transmitter to a reference shaft in the arrangement of FIG. 1.

DETAILED DESCRIPTION OF THE INVENTION

Figure 1:
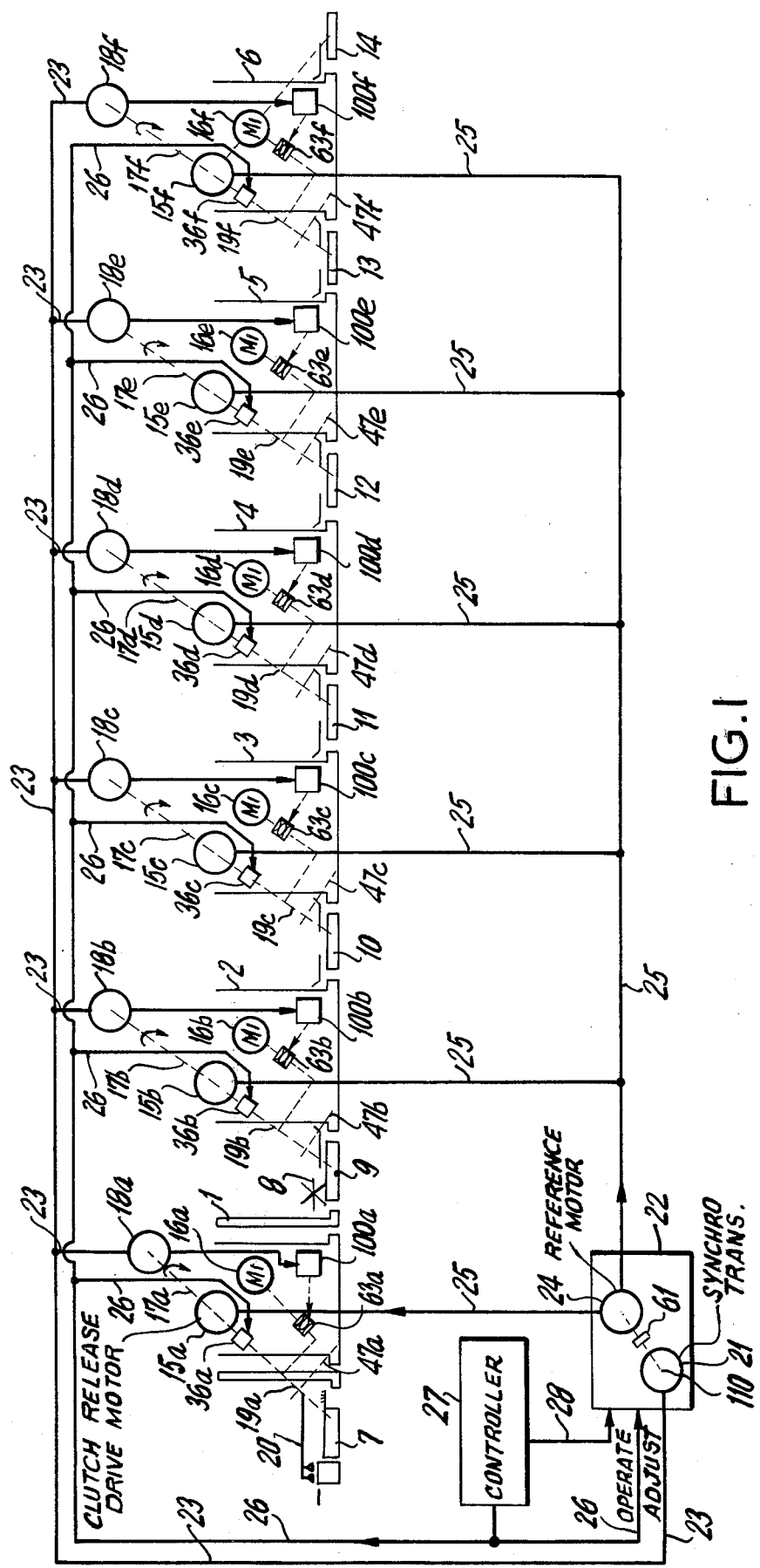
FIG. 1 is a pictorial diagram of an overall tandem-press production line having crankshaft angle adjustment facilities in accordance with the invention.

Referring now to the drawing, FIG. 1 illustrates a synchronized tandem-press production line having a plurality of presses 1–6 (e.g., punch presses) for performing operations on a succession of work-pieces (not shown). A plurality of DC drive motors 15a–15f are normally coupled to main crankshafts 47a–47f of the respective presses via links 19a–19f and normally engaged clutches 36a–36f. While such clutches are engaged, the motors 15 normally drive the respective presses synchronously at a relatively high operating speed (e.g., up to 27 rpm).

The successive workpieces to be operated on by the production line are fed into the first press 1 via a distack feeder 7. A pickup arm 20 associated with the first press 1 (which may be double-action press) is employed to lift and transfer successive workpieces from the feeder 7 to the press. After press 1 performs its operation, the workpiece is conveyed via an intermediate transfer feeder 9 into press 2. Illustratively, the feeder 9 is provided with a turnover mechanism 8. In like manner, the workpieces are transferred successively through the presses 2–6 via intermediate transfer feeders 10–13. After the final operation is performed on each workpiece by the last press 6, such workpiece is transferred to an unloader 14. The mechanisms 7 and 9–14 are operable in synchronism with the respective presses 1–6 via the links 19.

Rotation of the crankshafts 47 is controlled by a reference motor 24 of a master unit 22 via lines 25. The master unit in turn is regulated by commands from a controller 27. In the normal "operate" mode, the clutches 36 are engaged and the reference motor 24 causes the engaged motors 15 to drive the associated crankshafts 47 with a progressive synchronized motion. In this scheme, the crankshafts 47 are driven at the same speed; and the angular positions of the successive crankshafts 47a–47f are progressively delayed with respect to the position of a reference shaft 110 of the motor 24, with the position of crankshaft 47a illustratively coinciding with that of shaft 110. Such rotational scheme is depicted for a typical situation in FIG. 2.

As an example, the crankshaft 47b may typically lag shaft 110 by 25°; the crankshaft 47c, by 45°; the crankshaft 47d, by 65°; the crankshaft 47e, by 85°; and the crankshaft 47f, by 105°.

Whenever it is desired to "micro-inch" a press (illustratively press 1), i.e., to adjust the angle of the crankshaft 47a relative to the reference shaft 110, the controller 27 is switched to cause the outpulsing of an "adjust" command to the master unit 22. The resulting arrangement is shown more clearly in FIG. 3. The clutch 36a is first disengaged from the crankshaft 47a, which is thereby permitted to come to rest while the motor 15a runs free at its normal operating speed. At this time, the reference shaft illustratively operates at a constant speed of 0.9 RPM. The rotational position of the crankshaft 47a is placed under the selective control of a normally disabled micro-inching motor 16a, which may be a three-phase squirrel cage induction motor. The motor 16a serves to increment the crankshaft angle from its initial rest position to a desired adjusted position, i.e., top dead center. Such motor 16a is arranged to drive the crankshaft 47a at a speed slightly greater than the assumed 0.9 RPM speed of the reference shaft 110, and may illustratively be set at 1.0 RPM.

A normally disengaged clutch 61 in the master unit 22 is also engaged upon the "adjust" command to couple the reference shaft 110 to the shaft of a synchro transmitter 21. The latter accordingly exhibits an electrical output proportional to the instantaneous angular position of the shaft 110 relative to a predetermined position.

The output of the transmitter 21 (which may be energized from a suitable AC source via terminal 70) is applied to an electrical input of a synchro control transformer 18a. The shaft of the transformer 18a is suitably coupled to the crankshaft 47a. As a result, the transformer 18a provides an output voltage indicative of the instantaneous angular deviation of the crankshaft 47a from that of the reference shaft 110.

The electrical output of the transformer 18a is applied via line 66 to a control unit 100a which includes a rectifier 65 and a relay coil 67. The parameters of the transformer 18a and the control unit 100a are adjusted such that when the angular deviation of the crankshaft 47a from the shaft 110 is within a prescribed range $\pm \theta$ ("synchronizing range"), the coil 67 is energized to close an associated pair of contacts 63a. This is effective to close an energizing path from a supply terminal 62 to the motor 16a via a circuit breaker 64.

Figure 4:
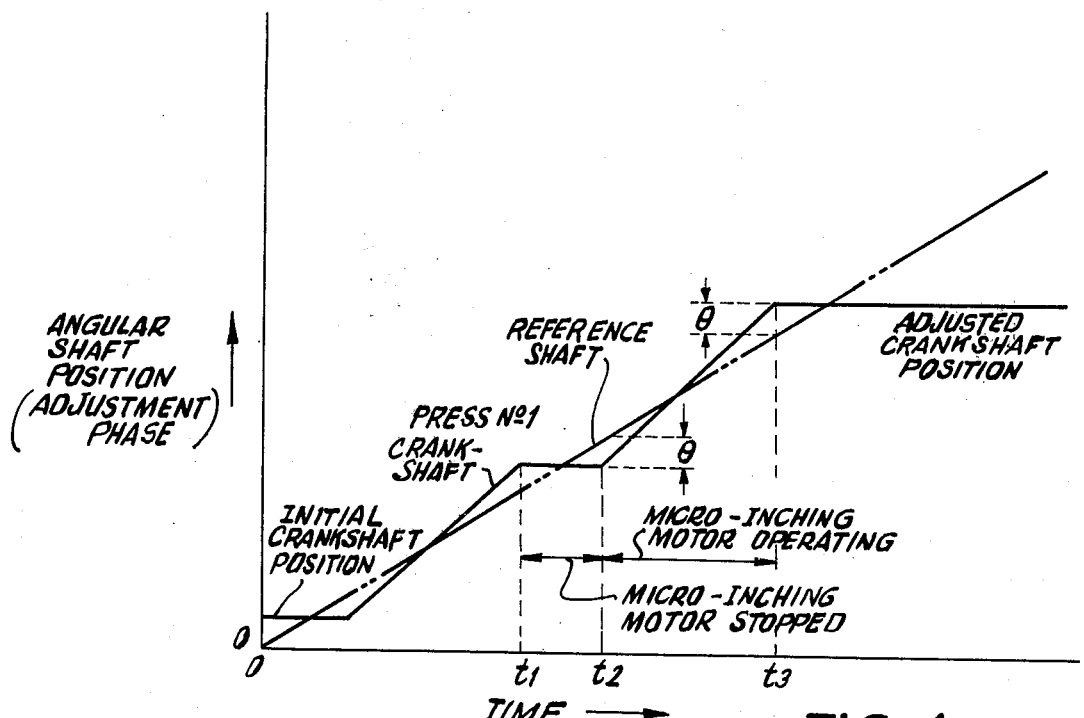
FIG. 4 is a graph illustrating the technique in accordance with the invention for micro-inching the crankshaft of a typical press of FIG. 1 during the adjustment phase.

The motor 16a is thus enabled when the position of the continuously moving reference shaft 110 leads the initially stationary crankshaft 47a by the angle $\theta$ (FIG. 4). Since, as indicated above, the enabling of the motor 16a causes the crankshaft 47a to rotate at an angular speed slightly greater than the speed of the reference shaft 110, the slope of the curve of FIG. 4 representing the crankshaft will be greater when the latter is moving than that of the curve representing the constantly rotating reference shaft. Because of such difference in slope, the originally lagging angular deviation of the crankshaft relative to the reference shaft will pass through zero and begin to exhibit a lead relative to that of the reference shaft. When such lead has increased to the value $\theta$, the relay coil 67 is deenergized to open contacts 63a and thereby to disable the motor 16a. The crankshaft 47a accordingly now comes to rest again at a new adjusted position.

It will be appreciated that such micro-inching operation may be repeated a desired number of times (two are depicted in FIG. 4) to arrive at the proper adjusted position. Also, because the incremental movement of the crankshaft in the adjust mode is restricted to a narrow angular range around zero angle deviation with respect to the reference shaft, the crankshaft remains effectively synchronized with the reference shaft.

In order to restore normal operation of the press after the adjustment phase, clutch 36a may be reengaged to thereby recouple the high speed, free-running motor 15a to the crankshaft 47a. Since the speed of the motor 15a is not diminished during the adjustment phase, the press down-time necessary to adjust the crankshaft position is greatly minimized.

The re-engagement of the clutch 36a may be accomplished through the controller 27 via a new "operate" command. Alternatively, provision may be made for re-engaging the clutch via the use of an interlock circuit 121 connected between an energizing terminal 122 and ground through auxiliary contacts 123a associated with the relay coil 67. In this scheme, the contacts 123a are closed whenever the control voltage at the output of the transformer 18a is indicative of the above-mentioned angular deviation $\pm \theta$ between the crankshaft 47a and the reference shaft 110. The interlock circuit 121 is suitably coupled to the clutch 36a to maintain such clutch disengaged while the interlock circuit is active, i.e., while the contacts 123a are closed. upon the release of the contacts 123a (e.g., when the motor 16a has been operated long enough to effect a crankshaft phase lead of $\theta$ with respect to the reference shaft,) the interlock circuit cuts out to re-engage the clutch 36a.

Figure 3:
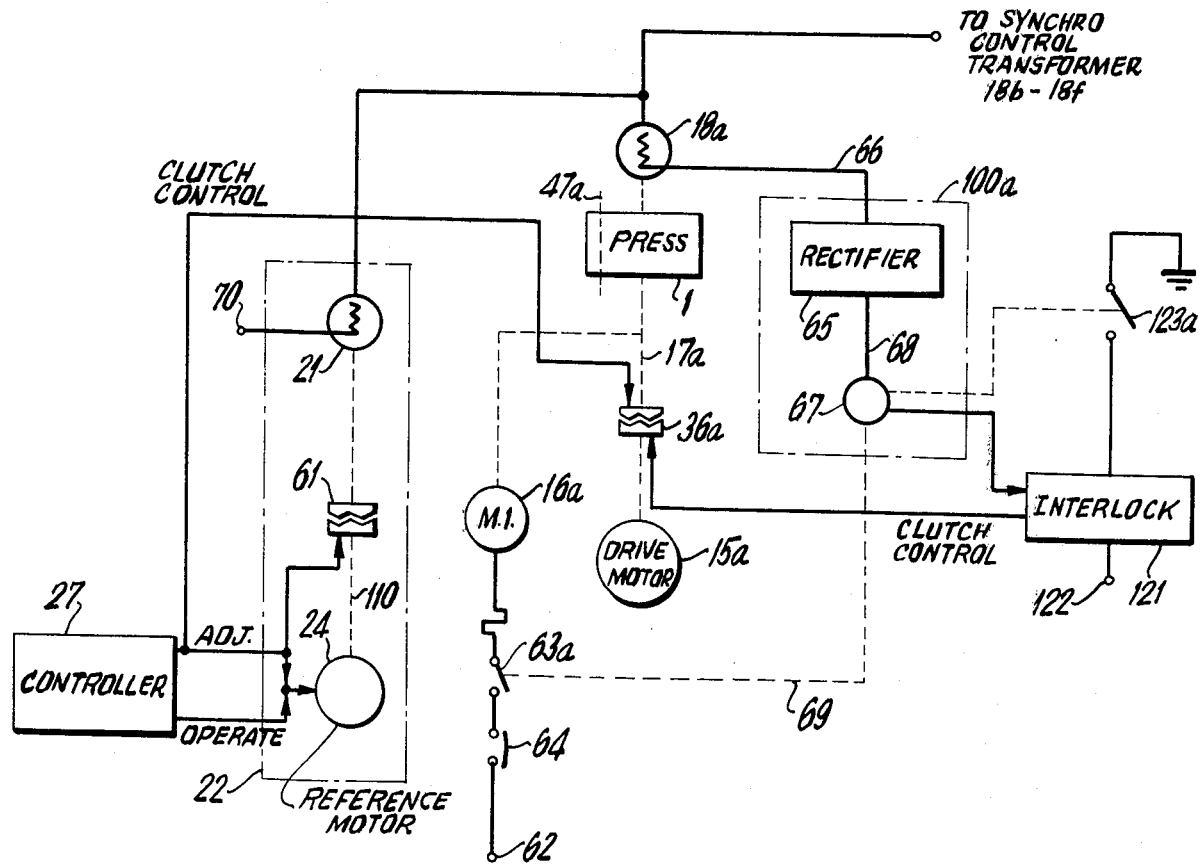
FIG. 3 is a detailed pictorial diagram of the crankshaft angle adjustment facilities of FIG. 1.

It will be appreciated that additional facilities identical to that indicated in FIG. 3 are provided for adjusting the angles of the crankshafts 47b–47f associated with the presses 2–6.

FIG. 5 illustrates a typical arrangement for coupling the motors 15a and 16a and the transformer 18a to the crankshaft 47a of the press 1. The motor 15a, on whose shaft a tachometer 34 may be mounted, is disengagably coupled to a common shaft 32 via a drive mechanism including a pulley 29 and a flywheel 31 normally coupled by a belt 33. Such drive 29, 31, 33 is disabled when clutch 36a is disengaged. The motor 16a is connected to shaft 32 via gears 38 and 42, the latter constituting the periphery of the casing of a brake 37. The shaft 32 is coupled to crankshaft 47a of press 1 via gears 45 and 46. A gear 50, in engagement with the gear 45, and a coupling 52 connect the shaft 32 to the shaft of the control transformer 18a.

Illustratively, the crankshaft 47a carries an eccentric 48 so that the rotation of such crankshaft causes up-and-down movement of a press slide 49.

FIG. 6 shows a gear reduction arrangement in the master unit 22a to permit efficient operation of the synchro transmitter 21. Such arrangement includes a gear reducer 55 connected between the reference motor 24 and the transmitter 21 through couplings 56 and 60.

In the foregoing, the invention has been described in connection with a preferred arrangement thereof for effecting rapid synchronous switching between the adjustment and the operating phases of the press. Many variations and modifications will now occur to those skilled in the art. It is accordingly desired that the scope of the appended claims not be limited to the specific disclosure herein contained.

What is claimed is:

1. In a press adapted for incorporation in a synchronized tandem-press production line wherein a first motor disengagably coupled to a crankshaft of the press normally drives the crankshaft at an angular speed synchronized with the rotation of a separate reference shaft, an arrangement for adjusting the angular position of the crankshaft with respect to the reference shaft when the crankshaft is disengaged from the first motor, which comprises:
   a normally disabled second motor coupled to the crankshaft and operative when enabled for rotating the crankshaft at an angular speed slightly greater than the angular speed of the reference shaft; and
   control means associated with the second motor for enabling the second motor when the angular position of the crankshaft lags that of the reference shaft by a prescribed amount $\theta$ and for thereafter disabling the second motor when the angular position of the crankshaft leads that of the reference shaft by a prescribed amount.

2. An arrangement as defined in claim 1, further comprising means rendered effective when the second motor is disabled for engaging the crankshaft with the first motor.

3. An arrangement as defined in claim 1, in which the control means comprises, in combination, rotary means for generating an electrical output proportional to the angular position of its shaft from a reference position; normally disengaged clutch means operative when engaged for coupling the reference shaft to the shaft of the rotary generating means; rotary transformer means coupled mechanically to the crankshaft and electrically to the output of the rotary generating means for producing a control voltage indicative of the deviation of the angular position of the crankshaft from that of the reference shaft, the control voltage falling within a prescribed range when the deviation is within the angular range $\pm \theta$; normally unoperated switching means operative to enable the second motor; and means coupled to the output of the rotary transformer and rendered effective when the control voltage is within the prescribed range for operating the switching means.

4. An arrangement as defined in claim 3, further comprising means operative when the crankshaft is disengaged from the first motor for engaging the clutch means.

5. An arrangement as defined in claim 3, in which the rotary generating means comprises a synchro transmitter, and in which the rotary transformer means comprises a synchro control transformer.

6. In a production line including N successive presses each having a crankshaft disengagably coupled to an associated one of N first motors to be driven thereby at an angular speed synchronized with the rotation of a separate reference shaft, the crankshafts of successive ones of the presses normally exhibiting, when driven by the associated first motors, a progressive shift in angular position relative to that of the reference shaft, an arrangement for adjusting the angular positions of the crankshafts with respect to the reference shaft while each crankshaft is disengaged from the associated first motor, which comprises:
   N normally disabled second motors operative when enabled for individually rotating the N crankshafts at an angular speed slightly greater than the speed of the reference shaft;
   a synchro transmitter;
   normally disengaged clutch means operative when engaged for coupling the reference shaft to the synchro transmitter;
   N synchro control transformers coupled mechanically to the crankshafts of the respective presses and electrically to the output of the synchro transmitter, each control transformer producing a control voltage indicative of the deviation of the angular position of the associated crankshaft from that of the reference shaft, the control voltage falling within a prescribed range when such deviation is within a prescribed angular range $\pm \theta$;
   N normally unoperated switching means operative to enable the respective second motors;
   N means individually coupled to the outputs of the respective control transformers and rendered effective when the associated control voltage is within the prescribed range for individually operating the N switching means; and means operative when the crankshafts are disengaged from the associated first motors for engaging the clutch means.

* * * * *